United States Patent [19]

van Rede

[11] 4,003,186

[45] Jan. 18, 1977

[54] SEALING HEAD FOR A SEALING DEVICE ADAPTED TO BE USED FOR A CONTAINER

[76] Inventor: Anthonie Jacobus van Rede, Jacob Catslaan 38, Uithoorn, Netherlands

[22] Filed: Nov. 3, 1975

[21] Appl. No.: 628,410

[30] Foreign Application Priority Data

Nov. 8, 1974 Netherlands ............ 7414622

[52] U.S. Cl. ................................ 53/88
[51] Int. Cl.² .............................. B65B 31/02
[58] Field of Search ....................... 53/88

[56] References Cited

UNITED STATES PATENTS 2,391,319  12/1945  Kronquest ........................ 53/88
2,510,457  6/1950   Bjering .......................... 53/88 X
3,334,467  8/1967   Bjering et al. ................... 53/88

Primary Examiner—Travis S. McGehee
Attorney, Agent, or Firm—Dressler, Goldsmith, Clement, Gordon & Shore, Ltd.

[57] ABSTRACT

A sealing head for sealing a container comprises a housing open at the lower end, the housing accommodating apparatus for securing a closure to the container, the sealing head being provided with means for evacuating air from the container prior to sealing.

5 Claims, 4 Drawing Figures

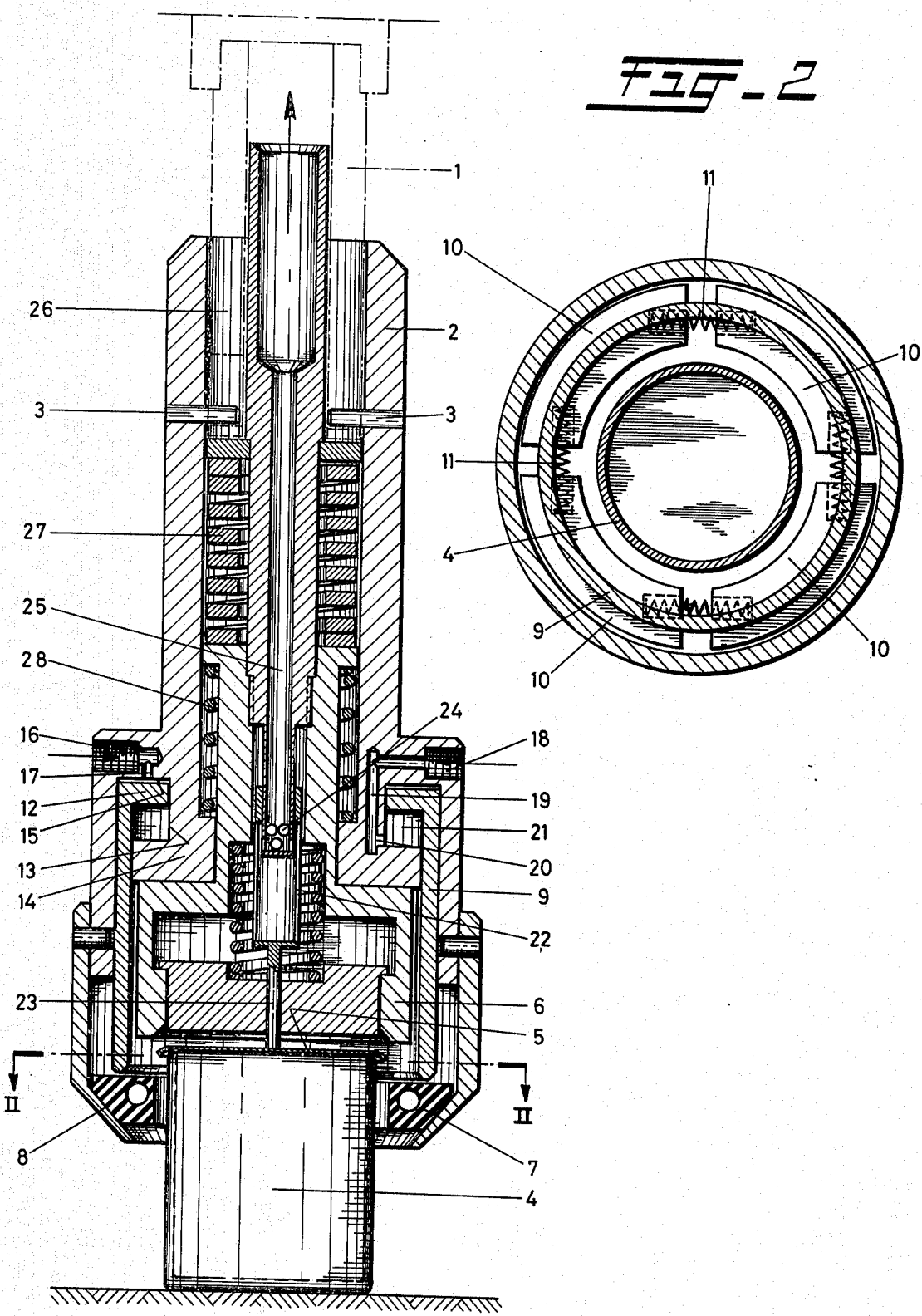

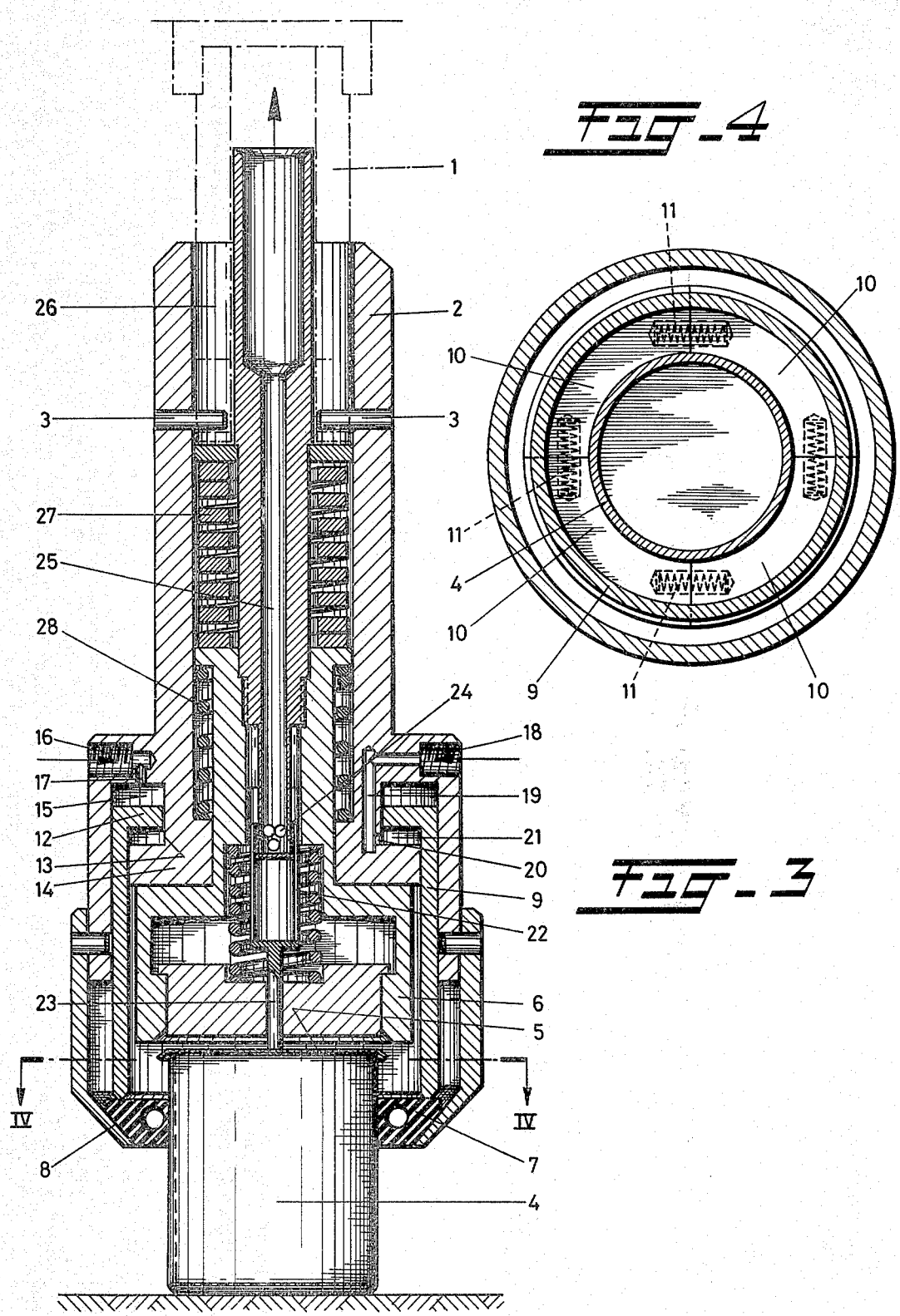

SEALING HEAD FOR A SEALING DEVICE ADAPTED TO BE USED FOR A CONTAINER

The present invention relates to a sealing head for a device adapted to be used for sealing a container, said sealing head comprising a housing being open at the lower end and which may be secured to a holder of the device, said housing comprising an apparatus which is adapted to secure a closure to the container.

Two methods are known to provide a container with a sealing while the space between the contents of the container and the sealing is being evacuated, i.e. the wet and dry method. According to the method first mentioned the container is conveyed through a steam tunnel wherein the sealing is secured onto the container by means of a sealing head. By cooling off the steam condensates and the container is vacuumized. This method, however, is not suitable for e.g. dry powders and, also, a high vacuum cannot be achieved.

In order to eliminate said disadvantages the dry method is introduced, in which the container is placed under a bellshaped member whereafter the air in the space of the bell is evacuated prior to sealing the container. The disadvantage of this method is that a large space is required as well as a long vacuum curve, as a consequence of which the operation takes a long time.

It is an object of the present invention to overcome said disadvantages and in accordance with the invention said object is achieved in that the sealing head is provided with means for evacuating the container prior to sealing.

In accordance with the invention it is made possible to evacuate the container via the sealing head, so that only the comparatively small space of the sealing head which is communicating with the container has to be evacuated.

An effective embodiment of a sealing head according to the invention is obtained in that the lower portion of the housing has a larger internal diameter than the remaining portion, said lower portion being adapted to be disposed partly around the upper portion of the container and said lower portion at its lower end being provided with a means for hermetically sealing the opening between the inner wall portion of the head surrounding the container and the outer wall of the container, and the sealing head is provided with means for communicating the interior thereof with a vacuum device.

The means for an hermetic seal preferably comprises a sealing ring, said ring being slidable in downward direction along a tapered wall portion of the lower end of the sealing head with the aid of a pressing element.

In addition, a highly effective embodiment is obtained in that the ring consists of at least two loose segments which are pressed apart in radial direction by means of spring elements.

In accordance with the invention, a very efficient seal is obtained in that the segments consist of resilient material and the diameter of the opening enclosed by the united segments is at least the same as the outside diameter of the container.

The dimensions of the segments are preferably such that in united position, without being pressed together, they enclose an opening the diameter of which is slightly larger than the one of the container. When the segments are pressed further against the container wall, the opposed end faces of the segments are pressed firmly against each other so that the risk of air leaks between said faces is avoided.

In addition, an effective embodiment is obtained in that the element for pressing the sealing ring comprises a sleeve member open at the lower end and being slidably disposed along the inner wall of the lower portion of the housing of the sealing head, said sleeve member having at the upper end an inwardly directed flange, said flange with its inner edge butting against a wall partially extending into the widened lower portion of the housing, said wall at the lower end having an outward flange which butts against the inner wall of the sleeve member, in which the lower portion of the housing has bores in a wall portion located above the flange of the sleeve member for introducing air under pressure into the space above the flange of the sleeve member.

When air under pressure is introduced into the housing the sleeve member is pressed downwards against the sealing ring, as a result of which said ring is moved downwards and is pressed against the container in a sealing manner.

In order to release the ring, after sealing the container, in accordance with a preferred embodiment an additional bore may be provided in the wall of the housing, said bore communicating with the space between the upper flange of the sleeve member and the lower flange of the wall extending in the lower portion of the housing.

In order to prevent that containers, which for some reason or other have not been provided with a cover when they are brought into the sealing machine, are evacuated via the sealing head, it is preferred according to the invention to provide the sealing heads with a central possibility therefor and in accordance with the invention this can be achieved in that the sealing mechanism of the sealing head is provided with a scanning pin projecting below said mechanism and being adapted for up and down movement, said pin co-operating with an element for opening and closing a vacuum tube extending through the sealing head and being adapted to be connected to a vacuum source.

The invention will now be explained more in detail with reference to a preferred embodiment illustrated in the drawing, wherein:

FIG. 1 shows the sealing head prior to the process of evacuation;

FIG. 2 is a sectional view of the sealing head of FIG. 1, taken along the line I—I;

FIG. 3 shows the sealing head during the process of evacuation as well as the attachment of the cover onto the container; and FIG. 4 is a sectional view of the sealing head according to FIG. 3 taken along the line IV—IV.

FIG. 1 illustrates the sealing head comprising a housing 2 the lower side of which is open and which may be secured to holder 1 of the device for providing a sealing 5 onto container 4. The sealing is realized with the aid of device 6. In the present embodiment being illustrated a sealing is used which is secured by the process of beading. In replacing device 6 also a screw-type sealing may be used.

When a container 4 with a large or small diameter has to be sealed, the sealing head may be replaced in a simple manner by the fact that the housing 2 of the sealing head may be secured to the holder 1 of the sealing device by means of a bayonet joint 3.

The sealing head is provided with means adapted to evacuate air from the container 4 prior to applying the sealing 5 so that the space to be evacuated remains small. Compared with the bell required with known devices a short vacuum stroke is sufficient, which involves a short time required for the operation and a smaller space required.

The lower portion of the housing 2 has a larger internal diameter than the remaining portion and is adapted to be provided partly around the upper portion of the container 4. A hermetic sealing ring 7 is located between the lower side of the lowest portion of housing 2 and the outer wall of the container. Thus, a space is created which is defined by the inner wall of the housing 2, the hermetic sealing ring 7 and the container 4. A vacuum device may be connected to said space in order to evacuate the space before the sealing 5 is secured to the container 4.

The sealing means comprises a sealing ring 7 resting on a tapered wall portion 8 of the sealing head. With the aid of a pressing element 9 the sealing ring 7 may be slided downwards along the wall portion 8 so that a hermetic seal is obtained along the wall portion 8 and the outer wall of the container 4.

It appears from FIG. 2 that the sealing ring 7 is built up of a number of segments 10. Springs 11 are accommodated in recesses in the mutually adjoining surfaces, said springs pressing apart the segments 10 in radial direction in order to facilitate the disposition of the head around the upper portion of the container. It is preferred that the segments are made of a resilient material and the opening enclosed by the united segments is slightly larger than the outside diameter of the container. The measures last mentioned ensure a highly effective hermetic seal. It is noted that the material of the segments 10 should not be too resilient. The element 9 for pressing the sealing ring 7 comprises a sleeve member with an open lower side, said sleeve member with its lower edge being in contact with sealing ring 7. The pressing element 9 has an inwardly directed flange 12 which flange with its inner edge abuts against wall 13. Wall 13 has an outward flange 14 abutting against the inner wall of the sleeve member of the pressing element 9. Above flange 12 of the pressing element 9 in the lower portion of the housing 2 of the sealing head are a number of bores 16 and 17, via which bores air under pressure may be introduced into the space 15 above the flange 12 of the pressing element, as a consequence of which the pressing element 9 is slided downwards.

Furthermore, bores 18, 19 and 20 have been provided in the housing 2 and air under pressure may be introduced into space 21 via said bores in order to release the pressing element.

The operation of the sealing head will now be described.

The container 4 is placed beneath the sealing head or vice versa via a rotary table or conveyor belt. The container 4 is filled and provided with a sealing 5. These actions may also take place at an earlier time. The holder 1 of the device for sealing container 4 is moved downwards with the aid of a mechanism, such as a cam disc, until the upper portion of the container 4 is surrounded by the sealing ring 7 (see FIG. 1). Hereafter, air under pressure is introduced into space 15 via bores 16 and 17 and the pressing element 9 urges the sealing ring into the position as shown in FIGS. 3 and 4. By this operation the container 4 is also centered relative to the sealing head.

A cylinder 22 with a scanning pin 23 secured thereto is present in the interior space of the housing. In its position of rest the cylinder 22 closes supply openings 24 of the vacuum tube.

As soon as holder 1 of the sealing device is moved further downwards, the scanning pin 23 strikes the sealing 5 of the container 4 and as the holder continues its downward movement the openings 24 are freed and the space above the container 4 is evacuated. Scanning pin 23 and cylinder 22 have two functions, i.e. opening the vacuum supply and control of the presence of sealing 5. If said sealing 5 were not present, openings 24 would not be freed and no vacuum was drawn.

The holder 1 of the sealing device is provided with slots into which bayonet pins 3 may slide. When the holder is moved further downwards the bayonet pins 2 slide into the slots 26 and springs 27 and 28 are compressed and element 6 folds the sealing 5 around the container 4.

The holder 1 is then moved upwards so that the spring 27 expands and spring 28 releases element 6. Thereupon the vacuum supply is shut off by cylinder 22 during the upward movement of holder 1.

Then the source of air under pressure is cut off from the bores 16 and 17 and connected to bores 18, 19 and 20 so that the pressing element 9 is released and segments 10 are pressed apart in radial direction under the influence of springs.

Finally, the sealing head may be removed.

It is noted that the tapered wall portion 8 is detachably connected to the housing 2 of the sealing head in order to be able to exchange ring 7 in a simple manner.

I claim:

1. A sealing head for sealing a container comprising a tubular housing open at its lower end, said housing having an upper portion and a lower portion with the lower portion having a larger internal diameter than the upper portion, said lower portion being adapted to be disposed partly around the upper portion of a container to be sealed, a sealing ring support carried by the lower end of said housing and said sealing ring support having an inwardly tapered wall portion adapted to surround the upper end of the container to be sealed, a sealing ring carried by said sealing ring support on the inwardly tapered wall portion thereof, a pressing element carried within the lower portion of said housing for sliding said sealing ring downwardly along said inwardly tapered wall portion to seal said ring against the container to be sealed, and means for evacuating air from the lower end of said housing.

2. A sealing head as recited in claim 1 in which said sealing ring is constituted by at least two loose segments, and spring elements are provided to press said segments apart in a radial direction.

3. A sealing head as recited in claim 2 in which said segments are made of resilient material and the diameter of the opening enclosed by said segments when united is slightly larger than the outside diameter of the container to be sealed.

4. A sealing head as recited in claim 1 in which said pressing element is constituted by a sleeve open at its lower end and slidably disposed along the inside of the lower portion of said housing, the upper end of said sleeve having an inwardly directed flange, said housing including a wall extending downwardly into the lower portion of the housing, said wall having an outwardly extending flange at its lower end, the inwardly directed flange of said sleeve bearing against said wall and the outwardly extending flange of said wall bearing against said sleeve, and air inlet means in said housing positioned above said sleeve for introducing air into the space above the flange of said sleeve to move said sleeve downwardly.

5. A sealing head as recited in claim 4 in which additional air inlet means are provided in said housing for introducing air into the space above the flange of said wall to move said sleeve upwardly.

* * * * *